(12) United States Patent
Chen et al.

(10) Patent No.: US 11,615,606 B2
(45) Date of Patent: Mar. 28, 2023

(54) TREE CROWN EXTRACTION METHOD BASED ON UNMANNED AERIAL VEHICLE MULTI-SOURCE REMOTE SENSING

(71) Applicant: Institute of Forest Resource Information Techniques CAF, Beijing (CN)

(72) Inventors: Qiao Chen, Beijing (CN); Yongfu Chen, Beijing (CN); Juan Wang, Kunming (CN); Zhiyang Xu, Hangzhou (CN)

(73) Assignee: INSTITUTE OF FOREST RESOURCE INFORMATION TECHNIQUES CAF, Beijing (CN)

( * ) Notice: Subject to any disclaimer, the term of this patent is extended or adjusted under 35 U.S.C. 154(b) by 0 days.

(21) Appl. No.: 17/882,885

(22) Filed: Aug. 8, 2022

(65) Prior Publication Data
US 2023/0039554 A1    Feb. 9, 2023

(30) Foreign Application Priority Data
Aug. 9, 2021    (CN) .......................... 2021109087369

(51) Int. Cl.
*G06V 10/44* (2022.01)
*G06T 7/155* (2017.01)
(Continued)

(52) U.S. Cl.
CPC .............. *G06V 10/443* (2022.01); *G06T 7/13* (2017.01); *G06T 7/149* (2017.01); *G06T 7/155* (2017.01);
(Continued)

(58) Field of Classification Search
CPC .... G06V 10/443; G06V 10/764; G06V 20/17; G06V 20/188; G06T 7/13; G06T 7/149;
(Continued)

(56) References Cited

PUBLICATIONS

Duan, Zhugeng, et al. "Assessing and correcting topographic effects on forest canopy height retrieval using airborne LiDAR data." Sensors 15.6 (2015): 12133-12155. (Year: 2015).*

(Continued)

*Primary Examiner* — Vu Le
*Assistant Examiner* — Tracy Mangialaschi
(74) *Attorney, Agent, or Firm* — WPAT, PC (57) ABSTRACT

A tree crown extraction method based on UAV multi-source remote sensing includes: obtaining a visible light image and LIDAR point clouds, taking a digital orthophoto map (DOM) and the LIDAR point clouds as data sources, using a method of watershed segmentation and object-oriented multi-scale segmentation to extract single tree crown information under different canopy densities. The object-oriented multi-scale segmentation method is used to extract crown and non-crown areas, and a tree crown distribution range is extracted with the crown area as a mask; a preliminary segmentation result of single tree crown is obtained by the watershed segmentation method based on a canopy height model; a brightness value of DOM is taken as a feature, the crown area of the DOM is performed secondary segmentation based on a crown boundary to obtain an optimized single tree crown boundary information, which greatly increases the accuracy of remote sensing tree crown extraction.

7 Claims, 8 Drawing Sheets

(51) Int. Cl.
*G06T 7/13* (2017.01)
*G06V 20/10* (2022.01)
*G06V 10/764* (2022.01)
*G06V 20/17* (2022.01)
*G06T 7/149* (2017.01)

(52) U.S. Cl.
CPC ............ *G06V 10/764* (2022.01); *G06V 20/17* (2022.01); *G06V 20/188* (2022.01); *G06T 2207/10028* (2013.01); *G06T 2207/10032* (2013.01); *G06T 2207/30188* (2013.01)

(58) Field of Classification Search
CPC ........... G06T 7/155; G06T 2207/10028; G06T 2207/10032; G06T 2207/30188
See application file for complete search history.

(56) References Cited

PUBLICATIONS

Marques P, Pádua L, Adão T, Hruška J, Peres E, Sousa A, Sousa JJ. UAV-based automatic detection and monitoring of chestnut trees. Remote Sensing. Apr. 9, 2019;11(7):855. (Year: 2019).*

Zhu R, Guo Z, Zhang X. Forest 3D reconstruction and individual tree parameter extraction combining close-range photo enhancement and feature matching. Remote Sensing. Apr. 2021;13(9):1633. (Year: 2021).*

Donmez C, Villi O, Berberoglu S, Cilek A. Computer vision-based citrus tree detection in a cultivated environment using UAV imagery. Computers and Electronics in Agriculture. Jun. 18, 2021;187:106273. (Year: 2021).*

* cited by examiner

TREE CROWN EXTRACTION METHOD BASED ON UNMANNED AERIAL VEHICLE MULTI-SOURCE REMOTE SENSING

TECHNICAL FIELD

The invention relates to the field of remote sensing recognition technologies, particular to a tree crown extraction method based on unmanned aerial vehicle (UAV) multi-source remote sensing.

BACKGROUND

Tree crown is an important parameter of forest investigation. A traditional method of obtaining tree crown parameters is mainly artificial ground investigation. This method is time-consuming, labor-consuming and laborious, which is not conducive to large-scale forest investigation. A birth of high spatial resolution remote sensing provides an important means for a rapid extraction of large-scale tree crowns, it has characteristics of high viewpoint, wide field of view, digitization, fast data acquisition, repeated and continuous observation. It has incomparable advantages over the traditional investigation methods. However, high resolution satellite remote sensing for the tree crown extraction still has disadvantages of low spatial resolution and poor flexibility.

In recent years, high-resolution aerial remote sensing, especially UAV remote sensing technology, has developed rapidly, and has become an important means to obtain the tree crown parameters quickly and in real time. It further has sensors with different performance such as visible light, multispectral, hyperspectral, light detection and ranging (LIDAR), etc. to obtain multi-source data. Because of its high resolution, strong flexibility, and multi-source data, it is gradually applied in the tree crown extraction.

At present, the tree crown extraction technology based on remote sensing images mainly uses high spatial resolution optical remote sensing images, LIDAR remote sensing images, and object-oriented classification, it supports vector machine classification, decision tree classification, maximum likelihood classification, expert classification and other methods to extract a tree crown boundary, measure a tree crown diameter, and calculate a tree crown area.

The tree crown extraction method from high spatial resolution optical remote sensing images is not suitable for dense forests. In the case of dense forest distribution and serious crown crossing and covering, a tree crown boundary is difficult to be distinguished by classification, and often an image spot may contain crowns of multiple trees. A precision of extracting tree crown from a forest with complex composition of arbor, crown and grass is low. When spectral characteristics of the arbor, the crown and the grass are similar, it is easy to cause misclassification, and the canopy or the glass are misclassified into the arbor. LIDAR recognition mainly obtains three-dimensional structural characteristics of trees, combined with hyperspectral continuous spectral information of the trees, so as to achieve a purpose of extracting and identifying accuracy of tree species. However, a cost of acquiring data based on hyperspectral data and LIDAR data is very high. LIDAR images mainly extract positions and heights of the trees. Morphological and structural features of tree crowns have not been effectively used, and the recognition accuracy is low. Traditional methods have the problems of using single remote sensing data and unsatisfactory tree crown extraction accuracy. Therefore, it is urgent to provide a tree crown extraction method based on UAV multi-source remote sensing.

SUMMARY

The invention provides a tree crown extraction method based on UAV multi-source remote sensing aiming at problems of insufficient spatial information and low recognition accuracy of tree species recognition in remote sensing images, which is suitable for dense forest tree crown recognition.

The invention can include the following steps:

A: obtaining a visible light image and LIDAR point clouds, preprocessing the LIDAR point clouds to obtain preprocessed LIDAR point clouds, and preprocessing the visible light image to obtain a digital orthophoto map (DOM);

B: generating a digital elevation model (DEM) and a digital surface model (DSM) based on the preprocessed LIDAR point clouds, and calculating a canopy height model (CHM) based on the DEM and the DSM;

C: performing watershed segmentation on the CHM to obtain an initial single tree crown boundary;

D: obtaining a tree crown distribution range based on the visible light image by an object-oriented multi-scale segmentation method, performing an object-oriented multi-scale segmentation on the visible light DOM to obtain a crown area and a non-crown area, and extracting the tree crown distribution range with the crown area as a mask; and E: taking the single tree crown boundary obtained by the CHM as a segmentation outer boundary, performing secondary object-oriented multi-scale segmentation on the tree crown distribution range (also referred to as tree crown distribution area) of the visible light DOM with brightness values as features, and obtaining an optimized single tree crown boundary.

In an embodiment, performing data preprocessing on the LIDAR point clouds includes: noise filtering, strips mosaic, block adjustment, point cloud denoising, quality detection and projection transformation.

In an embodiment, a calculation method of the CHM includes the following steps:

a: generating the DEM for classified ground point clouds by triangulated irregular network (TIN) interpolation;

b: generating the DSM by taking a first echo laser point reflected by LIDAR as a data source and using a Kriging interpolation method, and through an analysis of adjacent grids, using a Kriging interpolation method to supplement holes in the DEM and the DSM to remove invalid values; and c: obtaining the CHM by subtracting the DSM and the DEM, a resolution of the CHM being 0.5 m; and using a smooth filtering method to smooth and filter the CHM to remove holes and discontinuities.

In an embodiment, a method for splicing the visible light image includes: performing feature point extraction and matching, camera self-calibration, and dense point cloud reconstruction to obtain the visible light image after splicing.

In an embodiment, a method of preprocessing the visible light image after splicing includes: image orthophoto correction, image cutting, image enhancement and image stretching; wherein DEM data is used for the image orthophoto correction, and the DEM data is from the DEM generated by the LIDAR point clouds.

In an embodiment, the obtaining a tree crown distribution range based on the visible light image and an object-oriented multi-scale segmentation method, includes the following steps:

(1) establishing a classification system, and using the object-oriented multi-scale segmentation method to divide the crown area and the non-crown area of each sample spot into two different objects;

(2) selecting representative training samples based on the classification system; and performing feature optimization on 10 features consisting of three band mean values of the visible light image (i.e., Rmean, Gmean, Bmean), a brightness value (i.e., Brightness), a maximum value (i.e., Max. difff), a length-width ratio (i.e., Length/Width), a shape index, a gray level co-occurrence matrix dissimilarity (i.e., GLCM dissimilarity), a gray level co-occurrence matrix correlation (i.e., GLCM correlation) and gray level co-occurrence matrix texture mean (i.e., GLCM mean) to select optimal features;

(3) selecting the optimized features (i.e., optimal features) and using a nearest neighbor classification method to perform object-oriented classification to divide the crown area and the non-crown area into two different types of objects; and (4) in the environment for visualizing images (ENVI), taking the crown area as the mask, and obtaining the visible light DOM of the tree crown distribution range after removing information of the non-crown area.

In an embodiment, the CHM is segmented by a watershed method to obtain the initial single tree crown boundary.

The beneficial effects of the invention are as follows.

The invention comprehensively applies the UAV visible light remote sensing image and LIDAR point clouds, adopts the tree crown boundary divided by the watershed as the basis, and takes the brightness value of the visible light DOM as the feature, carries out the secondary segmentation on the crown area of the visible light DOM, obtains the optimized single tree crown boundary information, which greatly increases the accuracy of remote sensing tree crown extraction.

DETAILED DESCRIPTION OF THE EMBODIMENTS

The principles and features of the invention are described below, and the examples are only used to explain the invention, but not to limit the scope of the invention.

Figure 1:
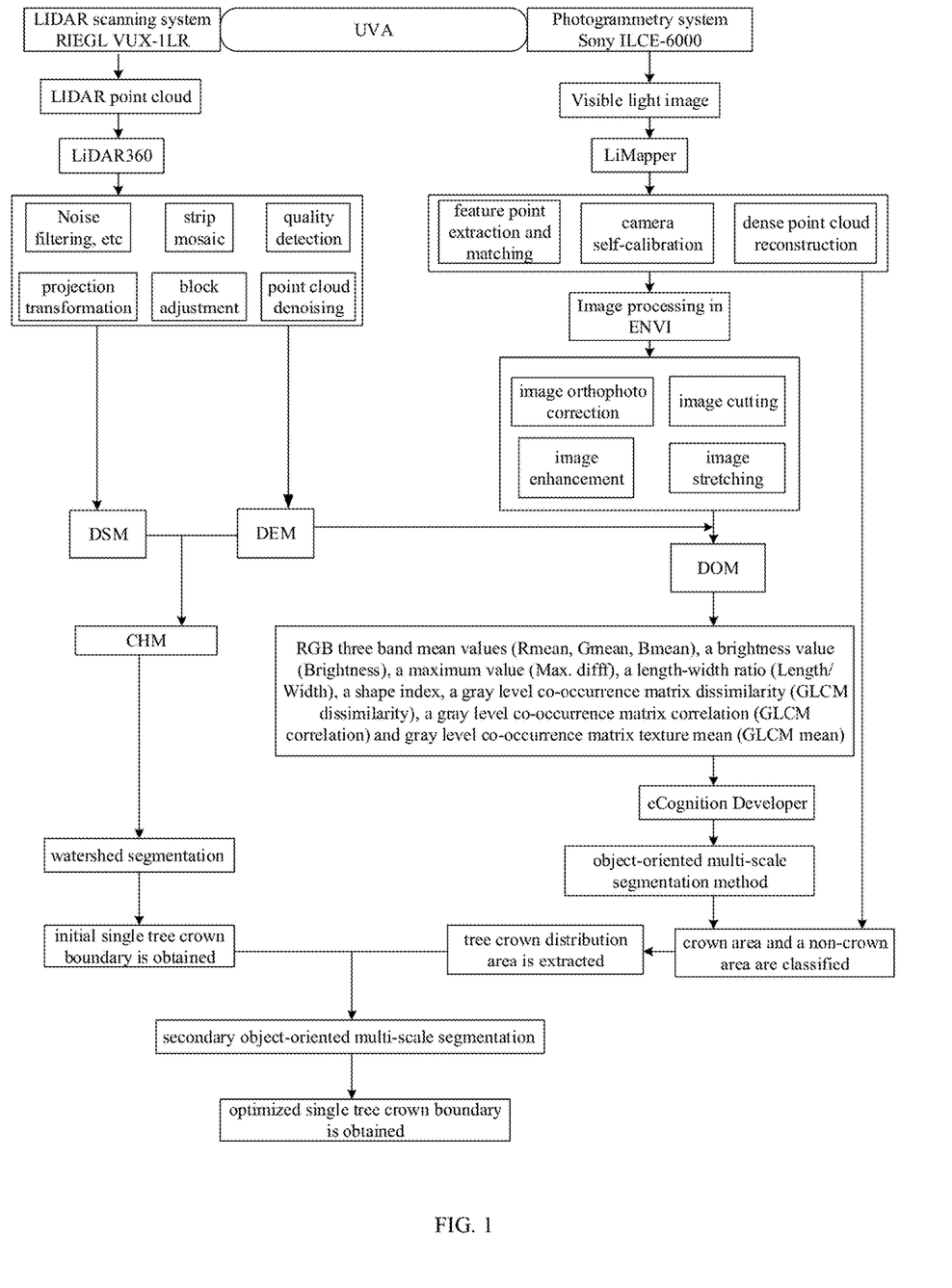
FIG. 1 illustrates a schematic flowchart provided by the invention.

As illustrated in FIG. 1, an embodiment of the invention provides a tree crown extraction method based on unmanned aerial vehicle (UAV) multi-source remote sensing, including the following steps.

A: obtaining a visible light image and a LIDAR point clouds, preprocessing the LIDAR point clouds to obtain preprocessed LIDAR point clouds, and preprocessing the visible light image to obtain a visible light digital orthophoto map (DOM).

UAV data can be obtained by a fixed wing UAV of Beijing Digital Green Earth Technology Co., Ltd, a length of a fuselage is 60 cm*60 cm*50 cm, a takeoff weight is 16.5 kg, and a maximum load is 8 kg. Sensors include two types of a high spatial resolution visible light camera and a LIDAR scanner. A data collection time is July 2019, a weather is sunny and windless, a flight speed is 6 m/s, a flight altitude is 160 m, and an average course overlap rate is 83.21%. A model of the visible light sensor (also referred to as the visible light camera) is Sony ILCE-6000, a total pixel is 24.7 million pixels, a color space is sRGB. A model of the LIDAR sensor (also referred to as LIDAR scanner) is RIEGL VUX-1LR, a field of view is 330°, a laser pulse emission frequency is as high as 820 KHZ, which can recognize multi-target echoes, and the accuracy is 15 mm.

The invention selects 10 numbers of circular sample plots of pure and even-aged forests of Chinese fir artificial forests with relatively single stand structures, and investigates a total of 512 trees. According to an investigation of forest resources planning and design, canopy densities can be divided, including 5 sample plots of medium canopy density (the canopy density is in a range of 0.40 to 0.69) and 5 sample plots of high canopy density (the canopy density is 0.70 or more). Each the sample plot has a radius of 16 m and a size of 800 m². A tally investigation is performed on each the sample plot, and each the sample plot is accurately positioned.

In this embodiment, visible light remote sensing data is preprocessed in the environment for visualizing images (ENVI), such as performing correction and cutting of the DOM of the visible light image to obtain DOM of the sample spot of the invention with a resolution of 0.05 m. A software LiDAR360 is used to process the UAV LIDAR data, and main processes include: strip mosaic, quality detection, projection transformation, point cloud denoising, noise filtering, ground point classification, etc. The UAV data processing software LiMapper is used.

B: generating a digital elevation model (DEM) and a digital surface model (DSM) based on the preprocessed LIDAR point clouds, and calculating a canopy height model (CHM) based on the digital elevation model DEM and the digital surface model DSM.

To extract a ground object height model from the LIDAR image, the LiMapper is used to perform CHM segmentation, that is, watershed segmentation, to obtain the ground object height model. Using triangulation irregular network (TIN) interpolation to generate the DEM for the point clouds after classification of ground points. Kriging interpolation method is used to generate the DSM with a first echo laser point reflected by LIDAR as a data source. Through analysis of adjacent grids, the above interpolation method is used to supplement holes of the DEM and the DSM to remove invalid values. The CHM (i.e., ground object height point cloud model) is obtained by subtracting the DSM and the DEM. The resolution of the CHM is 0.5 m, and a smooth filtering method is used to smooth and filter the CHM to remove holes and discontinuities.

The multi-scale segmentation algorithm of tree crown area information in visible light image is used to obtain a canopy distribution range (i.e., tree crown distribution range), including multi-scale segmentation, feature optimization, nearest neighbor classification, and mask.

(1) establishing a classification system, and using the multi-scale segmentation algorithm to divide the canopy area (i.e., crown area) and the non-canopy area (i.e., non-crown area) of each the sample spot into different objects;

(2) selecting representative training samples based on the classification system, and performing feature optimization on 10 features of RGB three band mean values (i.e., Rmean, Gmean, Bmean), a brightness value (i.e., Brightness), a maximum value (i.e., Max. difff), a length-width ratio (i.e., Length/Width), a shape index, a gray level co-occurrence matrix dissimilarity (i.e., GLCM dissimilarity), a gray level co-occurrence matrix correlation (i.e., GLCM correlation) and a gray level co-occurrence matrix texture mean (i.e., GLCM mean) to select optimal features;

(3) selecting the optimized features and using the nearest neighbor classification method to perform object-oriented classification to divide the canopy area and the non-canopy area into the different objects; and (4) in the ENVI, taking the crown area as the mask, and obtaining the canopy distribution range after removing information of the non-canopy area.

C: performing watershed segmentation on the CHM to obtain an initial single tree crown boundary.

Figure 2:
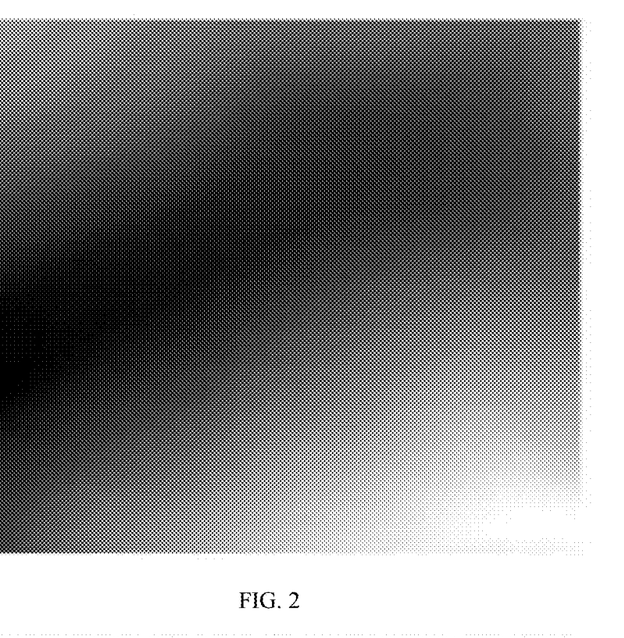
FIG. 2 illustrates a schematic diagram of DEM generated by LIDAR.
Figure 3:
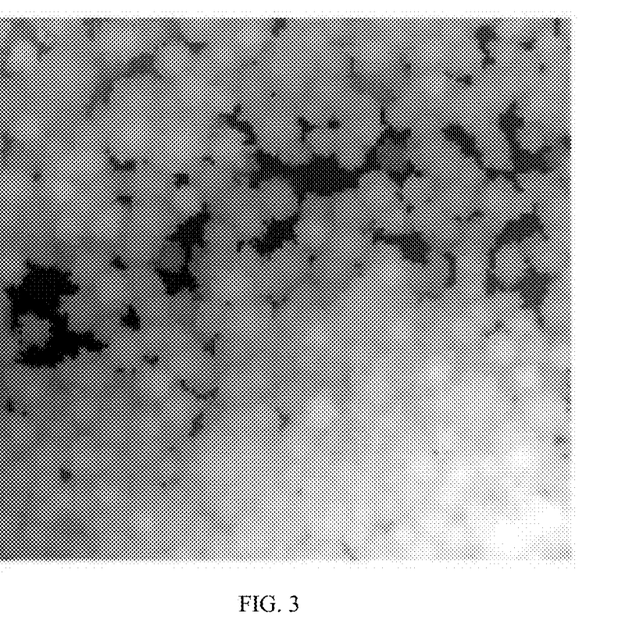
FIG. 3 illustrates a schematic diagram of DSM generated by LIDAR.
Figure 4:
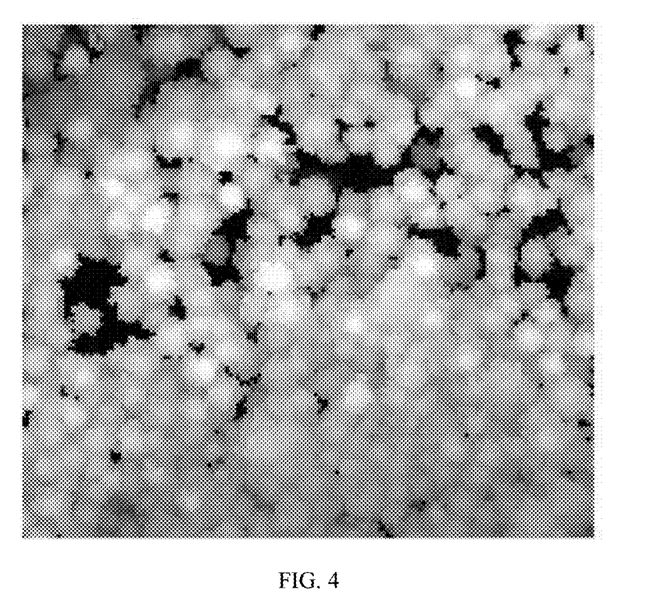
FIG. 4 illustrates a schematic diagram of CHM generated by LIDAR.
Figure 5:
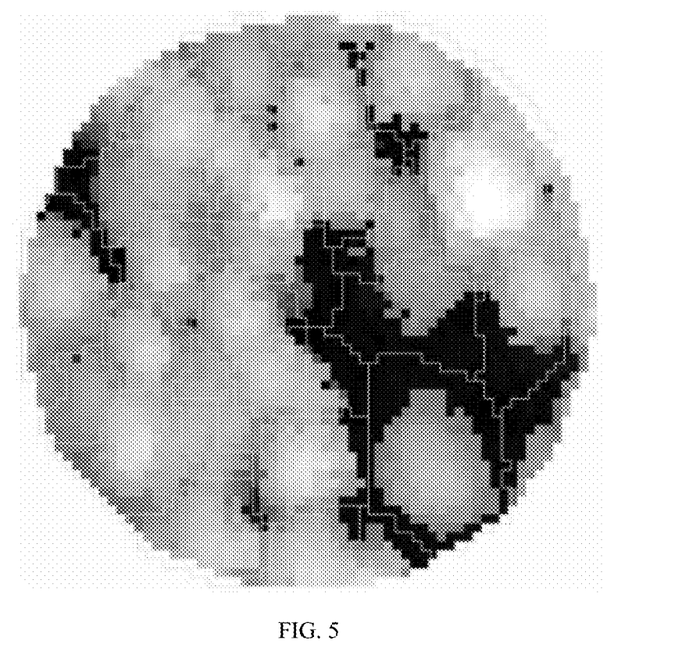
FIG. 5 illustrates a schematic diagram of CHM segmentation in a medium canopy density sample plot.
Figure 6:
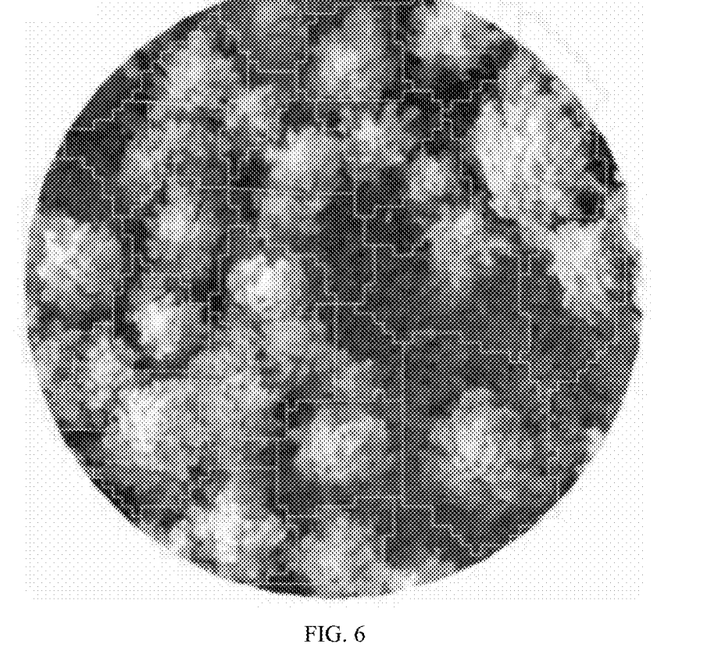
FIG. 6 illustrates a schematic diagram of CHM segmentation and DOM overlay in a medium canopy density sample plot.
Figure 7:
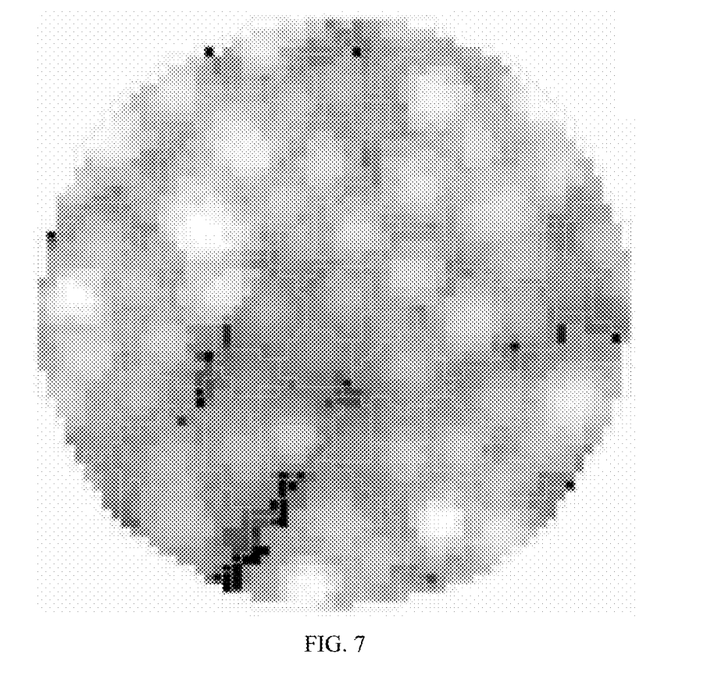
FIG. 7 illustrates a schematic diagram of CHM segmentation in a high canopy density sample plot.
Figure 8:
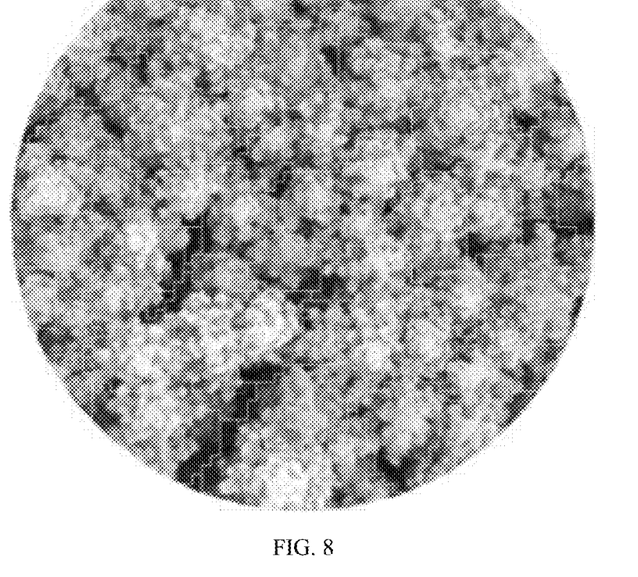
FIG. 8 illustrates a schematic diagram of CHM segmentation and DOM overlay in the high canopy density sample plot.

The DEM, DSM and CHM generated from the LIDAR point cloud data are illustrated in FIG. 2 to FIG. 4. When a Gaussian smoothing factor is 0.5 and a window size is 5, the influence of noises on the CHM is minimal. The result of watershed segmentation based on the CHM generated from the point clouds is illustrated in FIG. 3. It can be seen from the FIG. 3 that the single trees are segmented into different objects, but the description effect of the tree crown boundary of the single tree is poor. The segmented single tree object contains non-crown information such as greenery, shadow, bare land, etc., so it is still necessary to optimize the segmentation result to remove the interference of the non-crown information.

Figure 9:
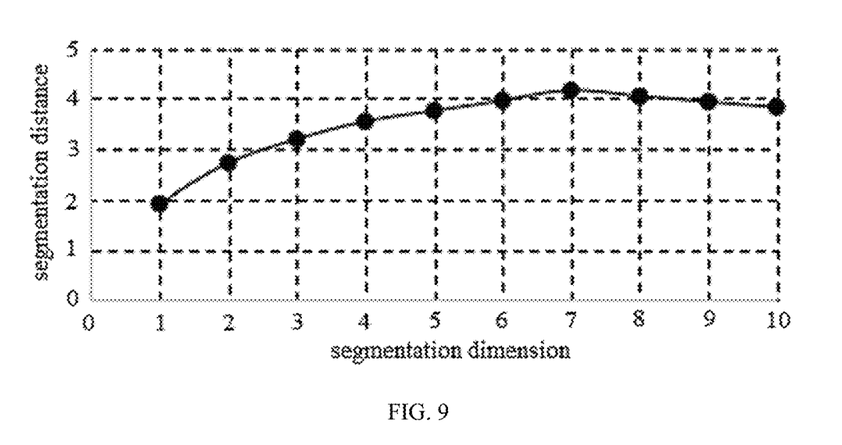
FIG. 9 illustrates a relationship between segmentation dimension and segmentation distance.
Figure 10A:
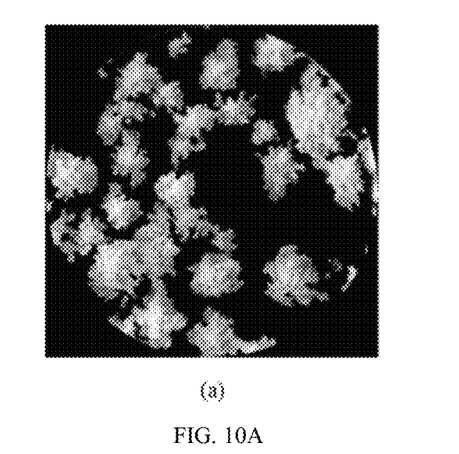
FIG. 10A illustrates a schematic diagram of an extraction result of a crown area in a medium canopy density sample plot.
Figure 10B:
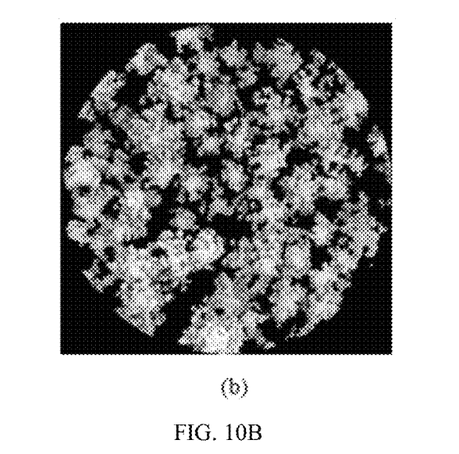
FIG. 10B illustrates a schematic diagram of an extraction result of a crown area in a high canopy density sample plot.
Figure 11A:
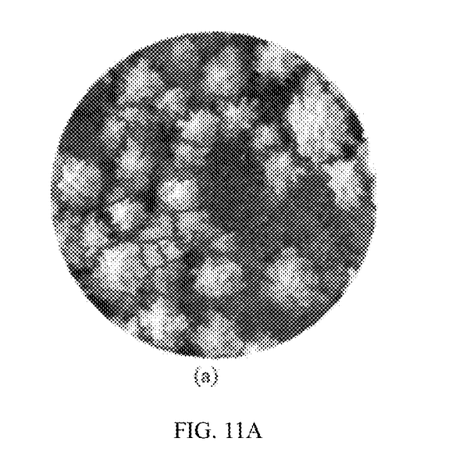
FIG. 11A illustrates a schematic diagram of a visual interpretation result of a middle canopy density sample plot.
Figure 11B:
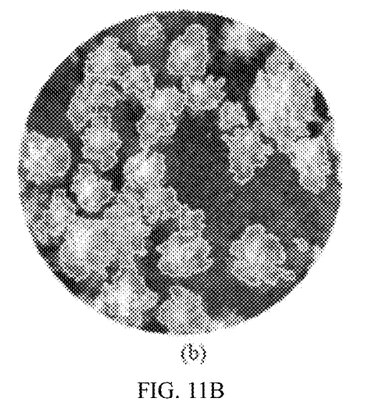
FIG. 11B illustrates a schematic diagram of a crown extraction result of a middle canopy density sample plot.
Figure 11C:
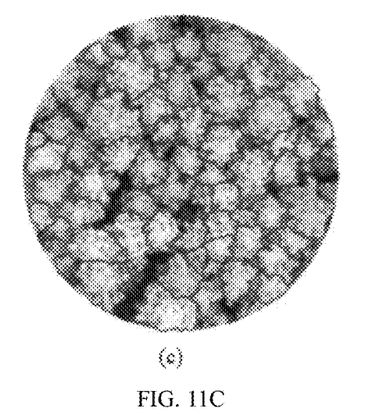
FIG. 11C illustrates a schematic diagram of a visual interpretation result of a high canopy density sample plot.
Figure 11D:
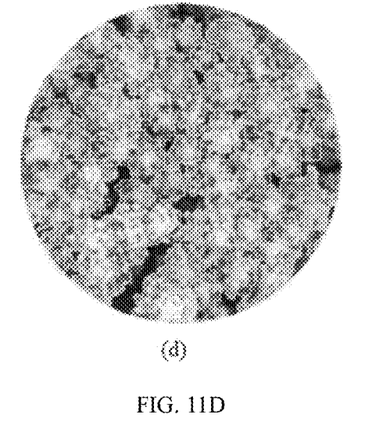
FIG. 11D illustrates a schematic diagram of a crown extraction result of a high canopy density sample plot.

The segmentation scale, shape index and compactness are important parameters for the multi-scale segmentation. When the segmentation scale is 25, the shape index is 0.2, and the compactness is 0.5, the crown area and the non-crown area of medium and high canopy density stands can be well segmented. Under this segmentation parameters, the classification method of sample model is used to optimize spatial features to reduce the increase of computation and redundancy caused by the large number of features. As illustrated in FIG. 9, when the number of features is 7 dimensions, the minimum separation degree is the best, and the best feature combination includes: $R_{mean}$, $G_{mean}$, $B_{mean}$, Brightness, Max. difff, Shape index, GLCM mean. The crown and non-crown areas are extracted according to the optimized features, and the result with the crown area as the mask are illustrated in FIG. 10A and FIG. 10B.

D: Obtaining the tree crown distribution range based on the visible light image and the object-oriented multi-scale segmentation algorithm, performing the object-oriented multi-scale segmentation algorithm on the visible light DOM to obtain the crown and non-crown areas, and extracting the tree crown distribution range with the crown area as the mask.

Since information values of the non-crown area after the mask is 0, using the brightness value as the feature, the object-oriented classification is performed to extract the single tree crown information. The segmentation parameter information is shown in Table 1. Importing the single tree crown boundary into ArcGIS and overlaying it with the DOM as illustrated in FIG. 11A to FIG. 11D.

TABLE 1 multiscale segmentation parameters under different canopy densities

| Sample spot | Segmentation scale | Shape index | Compactness |
|---|---|---|---|
| Middle canopy density | 220~230 | 0.2~0.4 | 0.5 |
| High canopy density | 220 | 0.2 | 0.5 |

Figure 12:
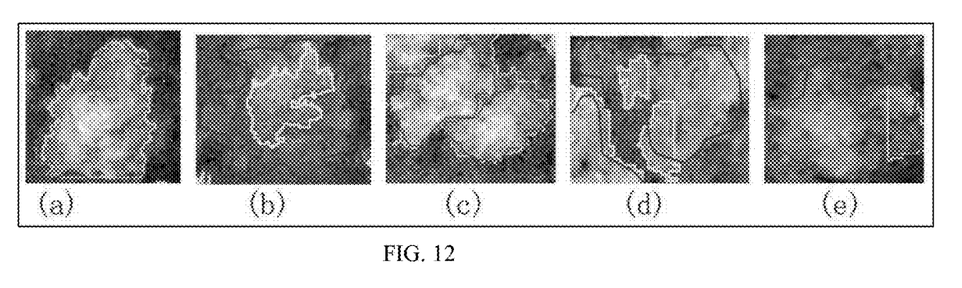
FIG. 12 illustrates a schematic diagram of 5 kinds of single tree segmentation situations of the invention; wherein: (a) matching, (b) close to matching, (c) merging, (d) misclassification, and (e) missed classification.
Figure 13:
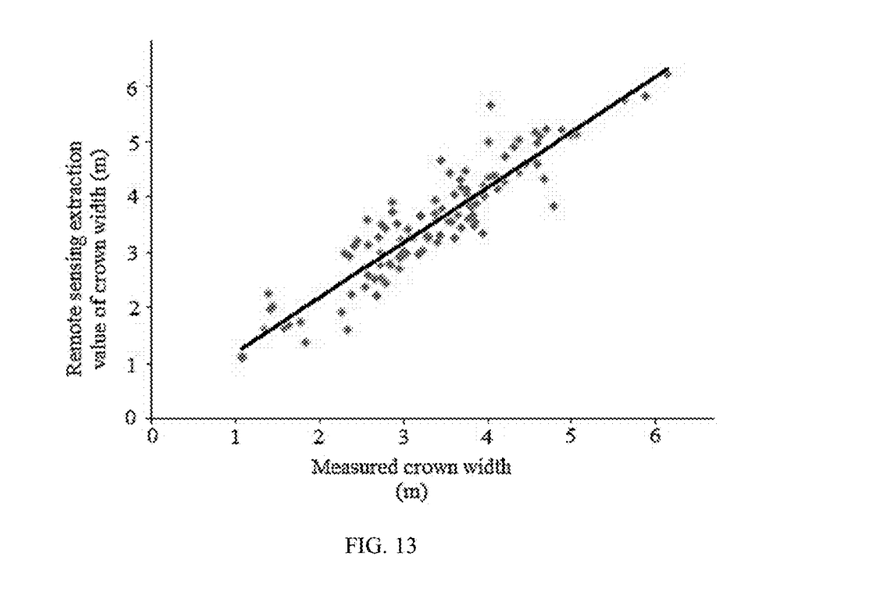
FIG. 13 illustrates a schematic diagram of single tree crown regression scatters of the invention.

The accuracy of the single tree is evaluated according to the five types of segmentation results in FIG. 12. Red in the FIG. 12 is a reference figure for segmentation of the tree crown, and yellow is the method of the invention for segmentation of the tree crown. The statistical results of the sample spots are shown in Table 2.

TABLE 2

The accuracy evaluation of single tree crown

| Canopy density grade | Sample plot No | Visual interpretation | Number of extractions | Correct segmentation | Precision | recall | F-measure |
|---|---|---|---|---|---|---|---|
| Middle canopy density | 1 | 34 | 31 | 29 | 93.55% | 85.29% | 89.23% |
| | 2 | 43 | 41 | 38 | 92.68% | 88.37% | 90.48% |
| | 3 | 56 | 53 | 48 | 90.57% | 85.71% | 88.07% |
| | 4 | 41 | 38 | 35 | 92.11% | 85.37% | 88.61% |

TABLE 2-continued

The accuracy evaluation of single tree crown

| Canopy density grade | Sample plot No | Visual interpretation | Number of extractions | Correct segmentation | Precision | recall | F-measure |
|---|---|---|---|---|---|---|---|
| | 5 | 31 | 30 | 29 | 96.67% | 93.55% | 95.08% |
| High canopy density | 1 | 57 | 54 | 49 | 90.47% | 85.96% | 88.29% |
| | 2 | 54 | 48 | 45 | 93.75% | 83.33% | 88.24% |
| | 3 | 69 | 61 | 54 | 88.52% | 78.26% | 83.08% |
| | 4 | 66 | 57 | 50 | 87.71% | 75.76% | 81.30% |
| | 5 | 61 | 51 | 44 | 86.27% | 72.13% | 78.57% |

It can be seen from Table 2 that there are 9 sample plots with more than 80% F-measure, the F-measure of the sample plot with the medium canopy density is in a range of 88.07% to 95.08%, and the F-measure of the sample plot with the high canopy density is in a range of 78.57% to 88.29%. In terms of the number and accuracy of tree crown extraction, most of the tree crowns are correctly segmented, but there are still missing errors and misclassification errors. The missing errors are mainly due to the interconnection and occlusion between the tree crowns, which leads to some single trees not being recognized. The misclassification errors are mainly due to the influence of shadow or noise in the visible light or LIDAR data of UAV, which leads to the recognition of pseudo single trees as single trees or the large tree crown of the single tree resulting in the recognition of the single tree as multiple trees during watershed segmentation. According to the accuracy, recall and F-measure of single tree crown extraction in the sample plots with medium and high canopy densities, it is feasible to extract the information of the single tree crown of Chinese fir by combining multi-source UAV data. The extracted F-measures of the single tree crown of the medium and high canopy density stands are 88.07% to 95.08% and 78.57% to 88.29% respectively, the extracted crown area and reference area R2 are 0.8591 and 0.7367 respectively, and the crown diameter and reference diameter are 0.8306 and 0.7246 respectively. The invention shows that the method of extracting tree crown information based on the combination of UAV visible light and LIDAR data is feasible in both medium and high canopy density stands, which can meet the development needs of modern forestry and provide a reliable technical support for quickly obtaining the tree crown information of the single tree under different canopy density stands.

E: taking the single tree crown boundary information of the CHM as the segmentation outer boundary, and carrying out secondary object-oriented multi-scale segmentation of the crown area of the visible light DOM with the brightness value as the feature to obtain optimized single tree crown boundary results.

The evaluation results of tree crown area accuracy of various sample plots on the sample plot scale are shown in Table 3. From the perspective of the relative error of crown areas of various sample plots, the relative error of low canopy density sample plot is in a range of −10.1% to 13.77%, and the average relative error is 4.92%. The high canopy density sample plot is in a range of −0.92% to 27.69%, and the average relative error is 14.92%. Among them, except for the low canopy density No. 5 and the high canopy density No. 1, the extracted canopy areas were smaller than the reference area, and the extracted crown areas of the other 8 sample plots were all larger than the reference area. The main reason for this phenomenon may be that when extracting the crown area, the characteristics of the non-crown objects are similar to those of the crown objects. When extracting crown information, some non-crown areas are divided into crown objects, resulting in the extracted area being larger than the reference area.

TABLE 3

The accuracy evaluation of crown area

| Sample spot | Sample spot No | Reference area (m$^2$) | Extraction area (m$^2$) | Relative error (%) |
|---|---|---|---|---|
| Low canopy density | 1 | 381.14 | 429.63 | 12.72 |
| | 2 | 427.00 | 458.02 | 7.26 |
| | 3 | 433.93 | 493.66 | 13.77 |
| | 4 | 437.94 | 442.16 | 0.96 |
| | 5 | 369.77 | 332.41 | −10.10 |
| High canopy density | 1 | 514.46 | 509.73 | −0.92 |
| | 2 | 508.50 | 649.32 | 27.69 |
| | 3 | 503.49 | 625.59 | 24.25 |
| | 4 | 567.34 | 659.61 | 16.26 |
| | 5 | 465.03 | 499.14 | 7.34 |

Among the 512 trees surveyed in this survey, 114 trees were randomly selected for accuracy verification. The measured crown width of a single tree (the average value of East-West crown width and North-South crown width) was regressed with the crown width extracted from UAV LIDAR and visible light remote sensing image, R2=0.8457.

The above is only an exemplary embodiment of the invention, but the scope of protection of the invention is not limited to this. Any those skilled in the art who makes equivalent replacement or change according to the technical scheme and inventive concept of the invention within the technical scope of the invention should be covered by the scope of protection of the invention.

What is claimed is:
1. A tree crown extraction method based on unmanned aerial vehicle (UAV) multi-source remote sensing, comprising:
obtaining a visible light image and light detection and ranging (LIDAR) point clouds, preprocessing the LIDAR point clouds to obtain preprocessed LIDAR point clouds, and preprocessing the visible light image to obtain a digital orthophoto map (DOM);
generating a digital elevation model (DEM) and a digital surface model (DSM) based on the preprocessed LIDAR point clouds, and calculating a canopy height model (CHM) based on the DEM and the DSM;
performing watershed segmentation on the CHM to obtain an initial single tree crown boundary;
obtaining a tree crown distribution range based on the visible light image by an object-oriented multi-scale segmentation method, performing an object-oriented multi-scale segmentation on the DOM to obtain a crown area and a non-crown area, and extracting the tree crown distribution range with the crown area as a mask; and taking the initial single tree crown boundary obtained by the CHM as a segmentation outer boundary, performing secondary object-oriented multi-scale segmentation on the tree crown distribution range of the DOM with brightness values as features, and obtaining an optimized single tree crown boundary;

wherein the generating a digital elevation model (DEM) and a digital surface model (DSM) based on the processed LIDAR point cloud, and calculating a canopy height model (CHM) based on the DEM and the DSM, comprises:

generating the DEM for classified ground point clouds by triangulated irregular network (TIN) interpolation;

generating the DSM by taking a first echo laser point reflected by LIDAR as a data source and using a Kriging interpolation method, and through an analysis of adjacent grids, using a Kriging interpolation method to supplement holes in the DEM and the DSM to remove invalid values; and obtaining the CHM by subtracting the DSM and the DEM, and using a smooth filtering method to smooth and filter the CHM to remove holes and discontinuities; wherein a resolution of the CHM is 0.5 m.

2. The tree crown extraction method based on UAV multi-source remote sensing according to claim 1, wherein the preprocessing the LIDAR point clouds comprises: noise filtering, strips mosaic, block adjustment, point cloud denoising, quality detection and projection transformation.

3. The tree crown extraction method based on UAV multi-source remote sensing according to claim 1, wherein a method for splicing the visible light image comprises: performing feature point extraction and matching, camera self-calibration, and dense point cloud reconstruction to obtain the visible light image after the splicing.

4. The tree crown extraction method based on UAV multi-source remote sensing according to claim 3, wherein a method for preprocessing the visible light image after the splicing comprises: image orthophoto correction, image cutting, image enhancement and image stretching; and wherein DEM data used for the image orthophoto correction is from the DEM generated by the LIDAR point clouds.

5. The tree crown extraction method based on UAV multi-source remote sensing according to claim 1, wherein the obtaining a tree crown distribution range based on the visible light image by an object-oriented multi-scale segmentation method, comprises:

establishing a classification system, and using the object-oriented multi-scale segmentation method to divide the crown area and the non-crown area into two different objects;

selecting representative training samples based on the classification system, and performing feature optimization on 10 features consisting of three band mean values of the visible light image, a brightness value, a maximum value, a length-width ratio, a shape index, a gray level co-occurrence matrix dissimilarity, a gray level co-occurrence matrix correlation and a gray level co-occurrence matrix texture mean to select optimized features;

selecting the optimized features, and using a nearest neighbor classification method to perform object-oriented classification to divide the crown area and the non-crown area into the two different objects; and taking the crown area as the mask, and obtaining visible light DOM of the tree crown distribution range after removing information of the non-crown area, in an environment for visualizing images (ENVI).

6. The tree crown extraction method based on UAV multi-source remote sensing according to claim 1, wherein the CHM is segmented by a watershed method to obtain the initial single tree crown boundary.

7. A tree crown extraction method based on UAV multi-source remote sensing, comprising:

obtaining a visible light image and light detection and ranging (LIDAR) point clouds, preprocessing the LIDAR point clouds to obtain preprocessed LIDAR point clouds, and preprocessing the visible light image to obtain a digital orthophoto map (DOM);

generating a digital elevation model (DEM) and a digital surface model (DSM) based on the preprocessed LIDAR point clouds, and calculating a canopy height model (CHM) based on the DEM and the DSM;

performing watershed segmentation on the CHM to obtain an initial single tree crown boundary;

obtaining a tree crown distribution range based on the visible light image by an object-oriented multi-scale segmentation method, performing an object-oriented multi-scale segmentation on the DOM to obtain a crown area and a non-crown area, and extracting the tree crown distribution range with the crown area as a mask; and taking the initial single tree crown boundary obtained by the CHM as a segmentation outer boundary, performing secondary object-oriented multi-scale segmentation on the tree crown distribution range of the DOM with brightness values as features, and obtaining an optimized single tree crown boundary;

wherein the obtaining a tree crown distribution range based on the visible light image by an object-oriented multi-scale segmentation method, comprises:

establishing a classification system, and using the object-oriented multi-scale segmentation method to divide the crown area and the non-crown area into two different objects;

selecting representative training samples based on the classification system, and performing feature optimization on 10 features consisting of three band mean values of the visible light image, a brightness value, a maximum value, a length-width ratio, a shape index, a gray level co-occurrence matrix dissimilarity, a gray level co-occurrence matrix correlation and a gray level co-occurrence matrix texture mean to select optimized features;

selecting the optimized features, and using a nearest neighbor classification method to perform object-oriented classification to divide the crown area and the non-crown area into the two different objects; and taking the crown area as the mask, and obtaining visible light DOM of the tree crown distribution range after removing information of the non-crown area, in an environment for visualizing images.

* * * * *